Sept. 6, 1966  W. W. GIBSON  3,271,657
WELDING SYSTEMS AND ASSOCIATED ADJUSTABLE WELDING REACTOR
Original Filed Sept. 29, 1958
2 Sheets-Sheet 1
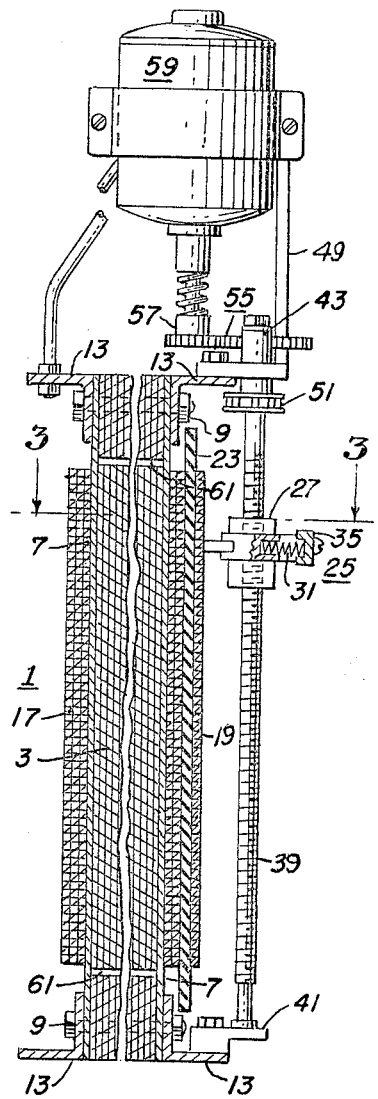
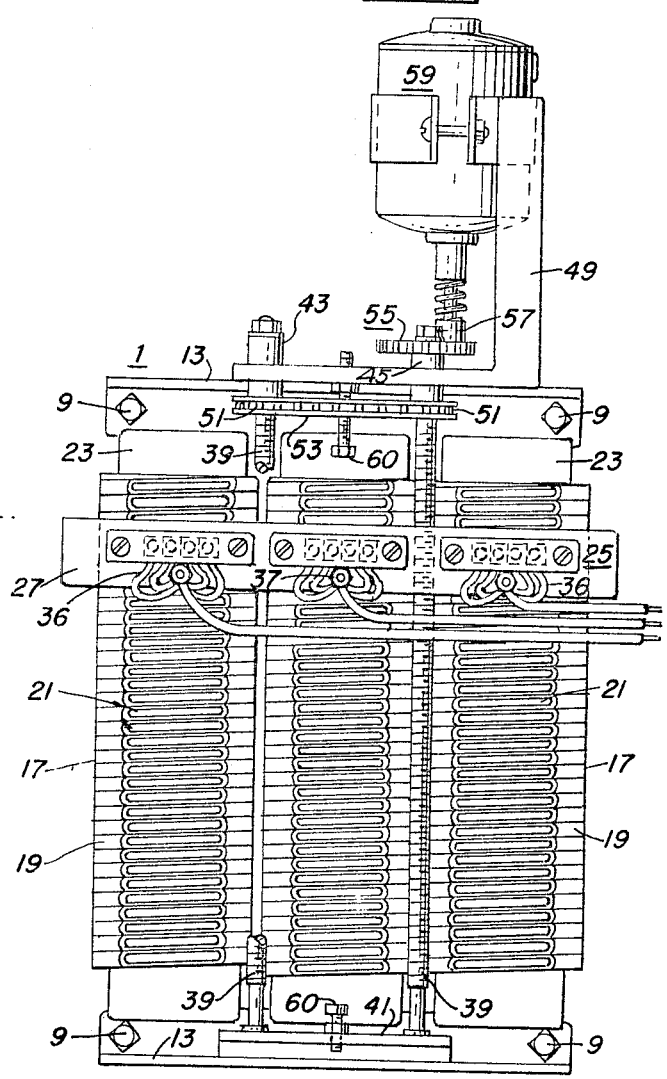
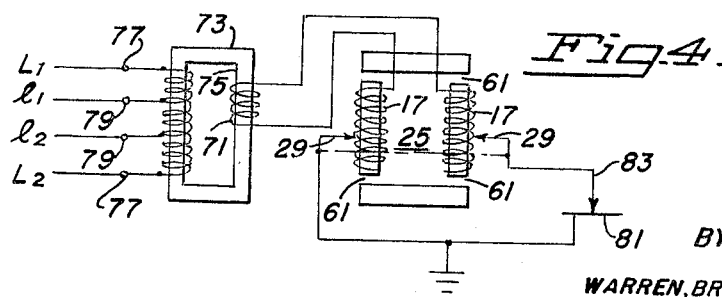
INVENTOR
WILLIAM W. GIBSON
BY
WARREN, BROSLER, CYPHER & ANGLIM
ATTORNEYS Sept. 6, 1966  W. W. GIBSON  3,271,657
WELDING SYSTEMS AND ASSOCIATED ADJUSTABLE WELDING REACTOR
Original Filed Sept. 29, 1958
2 Sheets-Sheet 2
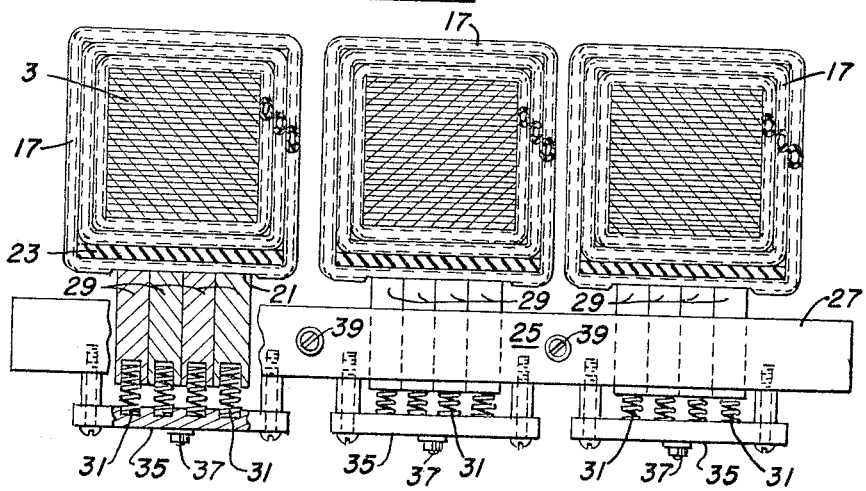
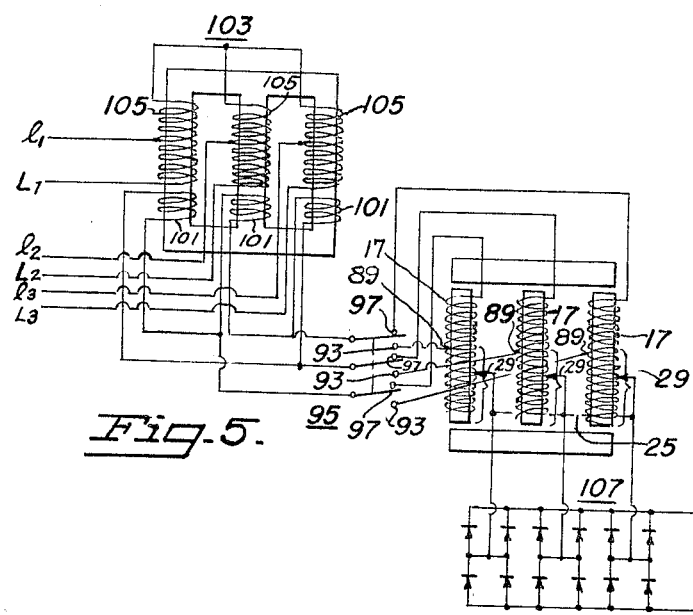
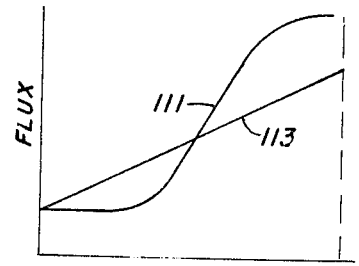
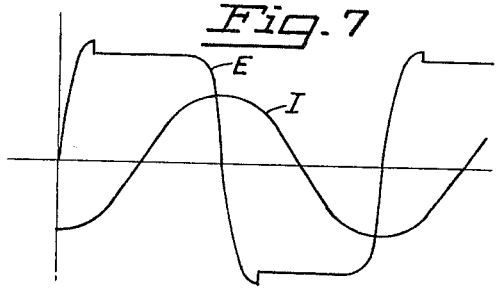
INVENTOR
WILLIAM W. GIBSON
BY
WARREN BROSLER CYPHER & ANGLIM
ATTORNEYS

United States Patent Office

3,271,657
Patented Sept. 6, 1966

3,271,657
WELDING SYSTEMS AND ASSOCIATED ADJUSTABLE WELDING REACTOR
William W. Gibson, Alameda, Calif., assignor, by mesne assignments, to Glenn Pacific Corporation, a corporation of California
Original application Sept. 29, 1958, Ser. No. 763,989, now Patent No. 3,212,040, dated Oct. 12, 1965. Divided and this application June 23, 1965, Ser. No. 466,400
3 Claims. (Cl. 323—44)

My invention relates to welding and more particularly to welding systems and associated adjustable welding reactor, and is a division of my application for Welding Reactor, Serial Number 763,989, filed September 29, 1958, now Patent Number 3,212,040, dated October 12, 1965.

Welding apparatus is designed to operate over a substantial range of welding current. For the current range of any particular apparatus, provision is made for varying the current within such range. The various means for accomplishing this in the past included, among other things, a movable coil to tighten or loosen its coupling to a primary winding, a movable magnetic shunt in an air gap of a transformer iron core, a saturable core reactor, and a tapped winding on an iron core. Within the current range of the equipment into which such devices have been incorporated, operation of the system invariably results in saturation of the iron core thereof as the current is increased toward the higher end of the current range for which the apparatus is designed. This has been found to result in erratic operation and poor welding results. To avoid this would necessitate designing such equipment to a size abnormally large for the range to be covered and too costly to be practical.

Among the objects of my invention are:
1. To provide a novel and improved welding system and involved apparatus;
2. To provide a novel and improved welding apparatus capable of functioning over a current range comparable to that of known apparatus, but without saturation;
3. To provide a novel and improved adjustable reactor for use in welding systems.

Additional objects of my invention will be brought out in the following description of a preferred embodiment of the same taken in conjunction with the accompanying drawings, wherein:

FIGURE 1 is a front view in elevation of an adjustable reactor constituting the heart of the present invention;

FIGURE 2 is a side view in elevation of the adjustable reactor of FIGURE 1;

FIGURE 3 is a view in section taken in the plane 3—3 of FIGURE 2;

FIGURES 4 and 5 are welding systems representative of the manner of use of the adjustable reactor of FIGURE 1;

FIGURE 6 is a view depicting by comparative curves, the underlying theory of the present invention;

FIGURE 7 is a view depicting characteristics of the welding current and voltage developed in accordance with the present invention.

I have found that excellent welding results in general can be realized if saturation of the iron core of the current adjusting apparatus can be avoided, and if certain characteristics exist in the welding voltage and current, namely (1) that the current wave have a steep wave front, (2) that the welding current lag the welding voltage by an angle approaching 90 degrees, and (3) that the welding voltage be of the order of its maximum value during that brief period when the welding current reverses sign.

Further, the problem remains to satisfy the foregoing requirements throughout the welding range of the apparatus, without having to build the equipment to a size which would be abnormally large and impractical, as well as prohibitive in cost.

The adjustable reactor depicted in FIGURES 1 through 3 of the drawings represents a preferred form of apparatus capable of meeting the foregoing requirements in a welding system.

Referring to the drawings for details of my invention, the specific form of the adjustable reactor 1 of the present invention as illustrated therein, involved a three-legged core 3 of iron laminations, the laminations being held together by end plates 7 of non-magnetic material and clamping bolts 9 along the upper and lower sides of the core. A length of angle iron along such upper and lower sides of the core provides lateral mounting flanges 13 which may be utilized both for mounting the reactor or for the assembling of components of the reactor.

Each leg of the core is of rectangular cross section and supports a winding 17 of like cross section in shape, whereby the outer layer of each winding will involve at least one planar side 19, and on such side, the insulation is removed along a path 21 extending the full length of the winding to expose or bare the wire of the adjacent turns of this outer layer. This outer layer along the exposed path thereof, is preferably backed up by a hard plate 23 of non-metallic material such as Bakelite or the like, which may be placed in position during the forming of the winding.

For effecting an adjustable electrical connection to such windings, I provide a gang brush holder 25 for longitudinal movement along the exposed portions of the windings, such gang brush holder involving a bar 27 of insulating material such as Bakelite or the like, provided with a slot facing each winding, to slidably receive a group of adjacently disposed brushes 29. These brushes, which may be of a thickness to span adjacent exposed turns, are held in electrical contact with the exposed turns of the associated winding by tail springs 31 in compression against a backing strip 35 mounted on the bar 27. Connections 36 from the brushes of each group are anchored to a common terminal 37.

The adjustable mounting for the gang brush holder involves a pair of vertical screws 39 journalled at their lower ends in a bracket support 41 affixed to a lower flange 13, while at their upper ends, these screws are journalled in bearings 43, 45 formed in a motor mounting bracket 49 bolted to an upper flange 13. The screws 39 threadedly engage the gang brush holder and adjustably support the same.

A sprocket 51 on each screw coupled by a sprocket chain 53 places the screws in drive connection with each other. With one of these screws connected through a gear train 55 and a slip clutch 57 to a drive motor 59 which is mounted above the reactor core by means of the motor bracket 49, the motor can thus drive the gang brush holder in a steady manner up or down the windings, and should the holder reach the limit of its permissible travel in either the up or down direction, the slip clutch 57 will prevent damage to the equipment. Such limits of permissible travel may be determined by adjustable stops 60.

The embodiment of the adjustable reactor thus described is for three phase operation and may be revised structurally for single phase operation by utilizing for example, a two legged core and either placing the entire winding on one leg or splitting it between both legs, and incorporating therewith, the sliding brush construction described above, structurally modified to fit the situation.

Manual operation of the gang brush holder may be substituted for the motor drive, if desired.

The electrical design embodied in the adjustable reactor described above is of equal and probably of greater importance to the present invention than the structural features illustrated and described. For one thing, it is important that the reactor be linear in its characteristics, an objective which can be ideally realized with an air core reactor. An air core reactor, however, with wire heavy enough to carry the currents employed in welding, would necessarily be excessively large and cumbersome, and economically unsound.

I have been able to approach the ideal, however, in apparatus which is small and practical, by constructing the reactor along the lines of that of FIGURE 1 and introducing gaps 61 in the iron core 3, preferably under the windings toward the middle of each leg, though for practical purposes, such gaps may be located adjacent the upper and lower end of each leg, which gaps, when considered together, predominate in determining the reluctance of the magnetic core and to such a degree that the reluctance will not vary more than plus or minus 3% from the mean value of current ranging from minimum value to short circuit current. In terms of size, such gaps will each be of the order of $3/16$ inch and may vary somewhat with the size and current range of the apparatus.

Because of its approach to the characteristics of an air core reactor, the voltage per turn of winding will be substantially uniform throughout the entire winding, and when such voltage per turn is of the order of one volt or less, a smooth substantially stepless change in reactance can be realized as the brushes are moved from one turn to another of the winding. Such low voltage per turn permits of use of brushes of carbon in lieu of heavy duty brushes of metal.

An adjustable reactor of the character described above, when connected in a welding circuit, will not upset or distort the welding voltage and current wave form normally appearing at the arc, such wave form for the voltage approaching that of a square top wave while that of the current will more closely approach a sine wave. The reactor while permitting the voltage and current waves to prevail as to shape, will, however cause the welding current to lag the welding voltage by an angle approaching 90 degrees, these characteristics and relationships being important to the present invention.

The permissive maintenance of the sine wave of current is particularly desirable in connection with the welding current in that the time period during which the current is of low value, as when changing sign, is quite short. Thus the period per cycle most conducive toward unwanted extinguishment of the arc is thereby maintained short.

During this brief time interval of low current values, the arc voltage attributable to the large angle displacement of the current with respect to the voltage, is in the neighborhood of its greatest value. Such prevailing high voltage during the critical period in each cycle, operates in the direction of maintaining arc current. These two factors, namely, the reduced periods of low current values and the existence of maximum voltage values during these periods, thus cooperate to maintain the arc.

The generally square top wave shape of the voltage renders the lag angle between the current and voltage non-critical, for it will be appreciated that in the presence of a square top wave of voltage, the maximum voltage will prevail within a wide range of angles.

The fact that the core will not saturate within the operating range of the equipment, serves to assure that these conditions will prevail throughout the entire operating range of the equipment, even at such high current values where prior art equipment would normally saturate and result in distortion of wave shapes and changes in phase angles to cause erratic functioning of the arc.

In employing a reactor of the present invention with a single phase alternating current circuit, as depicted in FIGURE 4, each leg of a two legged core will preferably carry a winding 17, each of which will have its outer layer exposed for sliding contact with a brush assembly 29. The reactor will be connected across the secondary 71 of a step-down transformer 73 having a primary winding on a core 75 and provided with terminals 77 for connection to a high voltage supply line, and intermediate tap connections 79, each at substantially the same electrical distance from its nearest terminal for connection to a supply line of lower voltage rating which will produce a secondary voltage of the same value as the higher voltage line.

The brush assembly 29 associated with one of the reactor windings will be connected to ground or to the work 81 while the brush assembly associated with the remaining winding will be connected to the welding electrode 83. The arc current can then be regulated by simultaneously shifting both brush assemblies along their respective windings.

For use in a three phase alternating current system, the output power from the reactor is customarily rectified for direct current welding. For such a circuit, as depicted in FIGURE 5, a three legged core is utilized with a winding 17 on each core. Each such winding may be tapped at an intermediate point 89 and connected to corresponding terminals 93 of a three blade, two way switch 95, the remaining terminals 97 of which are each connected to a corresponding end of each of the windings.

The blades of the switch connected by leads to the 3 phase secondary windings 101 of a 3 phase transformer 103 in which the primary windings 105 may be tapped for connection to a lower voltage supply line.

The brush assemblies 29 of the reactor are ganged, with each assembly connected to an appropriate point in a full wave rectifier circuit 107, the direct current output of which may be connected between the work 81 and the electrode 83 as in the circuit of FIGURE 4.

While the circuits of FIGURES 4 and 5 bear considerable similarity, on paper, to conventional welding circuits, the vital distinctions lay in the construction of the reactor, the resulting electrical characteristics thereof and the manner in which such electrical characteristics alter mode of operation of the circuit in which the reactor is employed.

Thus, referring to the curves of FIGURES 6 and 7, that of FIGURE 6 depicts the flux curve characteristic 111 of a conventional type reactor and by comparison, the flux curve characteristic 113 of applicant's reactor, while the curves E and I of FIGURE 7 illustrate the effect of the flux curve characteristic of applicant's reactor on the operation of the circuit, and more specifically on the welding voltage and current of the circuit.

Referring to FIGURE 6, the X-axis is a current axis along which is depicted circuit current to a value A representing the range of circuit current for which any particular welding apparatus is designed, while the Y-axis depicts the flux or flux density built up within the iron of the reactor for current values throughout such range of current.

It is noted that for a conventional type reactor, saturation of the core occurs within the specified current range, and such saturation has been found responsible for poor and erratic operation of welding equipment of the prior art.

By providing a reactor having substantially the linear characteristics of an air core reactor, the flux characteristic curve as represented by curve 113, approaches a straight line having a slope which cannot reach saturation within the operating range of the apparatus.

The effect of this is to preclude distortion and assure a substantially 90 degree lagging relationship between the welding voltage and welding current throughout the range of the apparatus, which relationship, I have found, to be quite essential to the maintenance of the arc because it places maximum voltage across the arc during that brief portion of each cycle when the welding current is in the region of zero value.

While I have disclosed my invention in its preferred form and in considerable detail, the same is subject to alteration and modification without departing from the underlying principles thereof, and I accordingly do not desire to be limited in my protection to the specific details illustrated and described except as may be necessitated by the appended claims.

I claim:

1. A welding circuit comprising means for reducing power line voltage to a welding voltage, an adjustable reactor including a winding on an iron core having air gap space giving said core a reluctance which varies not more than plus or minus 3% from the mean value of current ranging from a minimum value to short circuit current, means for connecting said reactor winding to said voltage reducing means, and an adjustable connection on said reactor winding.

2. A welding circuit comprising a step down transformer having a primary winding and a secondary winding, said primary winding having input terminal connections thereto, an adjustable reactor including a winding on an iron core having air gap space giving said core a reluctance which varies not more than plus or minus 3% from the mean value of current ranging from minimum value to short circuit current, means connecting said reactor to the secondary winding of said transformer, and an adjustable connection on said reactor winding.

3. A welding circuit comprising a step down transformer having a primary winding and a secondary winding, said primary winding having input terminal connections at the ends thereof, and intermediate connections, each at substantially the same turn distance from its nearest terminal connections, an adjustable reactor including a winding on an iron core having air gap space giving said core a reluctance which varies not more than plus or minus 3% from the mean value of current ranging from minimum value to short circuit current, means connecting said reactor winding to the secondary winding of said transformer, and an adjustable connection on said reactor winding.

References Cited by the Examiner

UNITED STATES PATENTS

| | | | |
|---|---|---|---|
| 1,353,711 | 9/1920 | Bergman | 323—82 |
| 1,896,995 | 2/1933 | Bagnall | 323—43.5 |
| 2,085,242 | 6/1937 | Weaver | 322—47 X |
| 2,114,143 | 4/1938 | Hunter | 323—47 X |
| 2,486,165 | 10/1949 | Journeaux | 323—57 |

JOHN F. COUCH, *Primary Examiner.*

MILTON O. HIRSHFIELD, *Examiner.*

W. E. RAY, *Assistant Examiner.*